March 29, 1955     R. P. VINCENT     2,704,980
WELL-PRODUCING APPARATUS

Filed Nov. 22, 1950     3 Sheets-Sheet 1

RENIC P. VINCENT
*INVENTOR.*

BY *Goodwin*
*ATTORNEY.*

March 29, 1955   R. P. VINCENT   2,704,980
WELL-PRODUCING APPARATUS
Filed Nov. 22, 1950   3 Sheets-Sheet 3

RENIC P. VINCENT
*INVENTOR.*

BY Goodwin

*ATTORNEY.*

United States Patent Office 2,704,980
Patented Mar. 29, 1955

2,704,980

WELL-PRODUCING APPARATUS

Renic P. Vincent, Tulsa, Okla., assignor to Stanolind Oil and Gas Company, Tulsa, Okla., a corporation of Delaware Application November 22, 1950, Serial No. 197,048

10 Claims. (Cl. 103—52)

This invention pertains to an apparatus for artificially producing wells. More particularly, the invention pertains to an improved plunger for use in gas lifting fluids in a vertical tube, such as in an oil well.

In gas lifting liquid from a well, the common practice has been to inject gas by any of a number of means into an eduction tube below the level of the fluid, thereby raising the liquid level to the surface, either by aeration of the column of liquid in the eduction tube or by displacement of slugs of liquid with the gas. As is well known, by either method, the efficiency of the process is generally lower than that of other means of artificial lift, and therefore gas-lift operations in many wells—particularly stripper or marginal wells—are not justified.

It has been proposed to improve this efficiency of gas lift by inserting a divider means, such as a plunger, between the liquid column and the gas column which is used to lift the liquid column to the surface. By this means, by-passing of liquid with the gas is avoided, and the gas/liquid ratio is substantially reduced.

Various means have been proposed for causing the plunger to reciprocate automatically in a vertical tube. For example, in some cases, the plunger is reversed at the end of a stroke when it strikes a bumper which shifts a valve in the plunger. It has also been proposed to cause the plunger to reciprocate automatically by changes in pressure on the plunger, that is, causing the plunger to rise after a predetermined pressure head is built up above the plunger and to fall when the pressure head has decreased to a predetermined amount. The mechanism required to cause the previously proposed plungers to reciprocate in a vertical tube is, in general, too complex to operate continuously over extended periods of time without some personal attention, maintenance, repair, etc.

It is therefore an object of this invention to provide an improved gas-lift plunger. It is a further object of this invention to provide a gas-lift plunger which will operate continuously for extended periods of time without maintenance or the like. A still more specific object of this invention is to provide a reciprocating gas-lift plunger for raising well fluids, which is reversed at the ends of each stroke by an improved apparatus. These and other objects of the invention will become apparent from the following description of certain embodiments of the invention which are presented for the purpose of illustration. In this description, reference will be made to the accompanying drawings in which:

This invention, in brief, comprises an apparatus such as a gas-lift plunger which is caused to reciprocate in a vertical tubing by the expansion and contraction of an expansible seal which, on expansion, effectively plugs the tubing, the seal being actuated by changes in temperature. That is, the seal in my improved apparatus is expanded to plug the tubing at the bottom of the well by the temperature at the bottom of the well and is contracted at the surface to less than tubing diameter as the apparatus is cooled by surface temperature and expansion of the lifting gas.

Figures 1, 2:
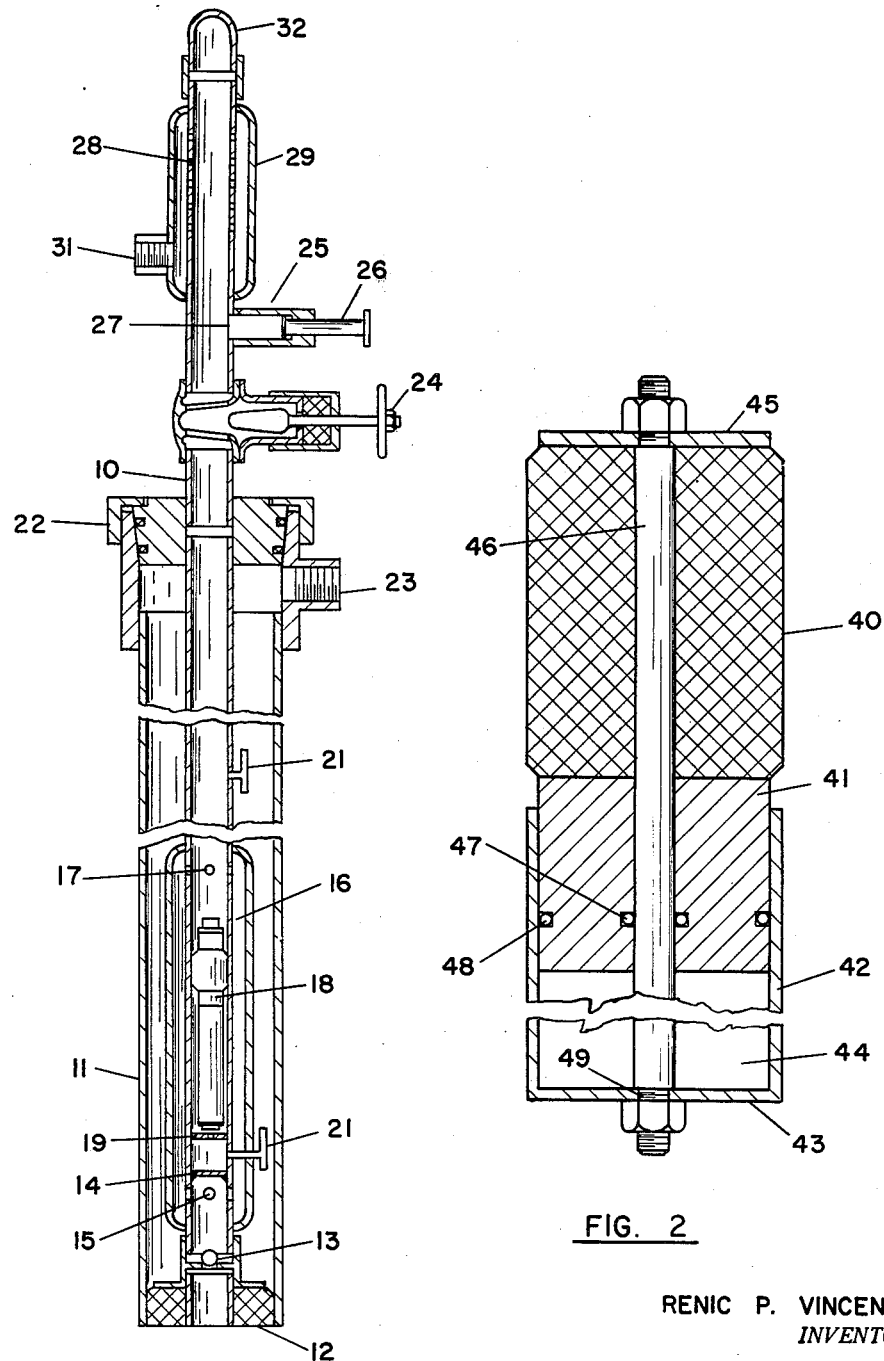
Figure 1 is a diagrammatic cross-sectional view of a gas-lift system showing my improved gas-lift plunger installed in a well.
Figure 2 is a cross-sectional view of a diagrammatic representation of one embodiment of an improved gas-lift plunger.

Referring now to Figure 1, the tubing 10 is shown in position within a gas-lift well having a casing 11. The annular space between the tubing and casing is sealed near the bottom of the well but above the producing formations by a packer 12, whereby the gas used to lift the oil does not come into contact with the producing formations. A standing valve 13 is located in the tubing at a point below the producing fluid level of the well. Above the standing valve a solid plug 14 is suitably fixed, as by welding, into the tubing to prevent fluid flow through the tubing, and to cause well production entering the tubing to flow through lower perforations 15, by-pass 16, and upper perforations 17. By this means, oil may continue to flow into the tubing above the plunger after the plunger 18 comes to rest on bottom stop 19, expands, and seals the tubing. Conventional gas-lift valves 21 are spaced along the tubing in the annular space between the tubing and casing with the bottom gas-lift valve located below the plunger seat 19 and above plug 14. Any number of gas-lift valves may be used along the tubing for the purpose of unloading the casing and tubing when they become filled with liquid. The spacing of these valves, as is well known in the art, is adjusted such that the available gas pressure will overcome the maximum fluid head above any gas-lift valve. In a preferred embodiment, the gas-lift valves are actuated by the pressure of the gas in the annular space between the tubing and the casing, the bottom valve being actuated by a pressure substantially less than the pressure required to actuate any of the upper valves. It is desirable that the unloading upper gas-lift valves be actuated at progressively decreasing pressures, starting at the top. Thus, the tubing above the top valve may be unloaded when it becomes filled with liquid by application of high pressure, for example, a pressure in the range of about 500–1000 p. s. i.; and, when the liquid has been discharged from this section, the pressure of the gas in the annulus is reduced to below the opening pressure for the top gas-lift valve, thereby selectively closing that valve and displacing the liquid from the annulus and the tubing between the first and second gas-lift valves. All the gas-lift valves may be actuated in this manner by control of the gas pressure in the annular space between tubing 10 and casing 11 to unload the tubing. The bottom gas-lift valve preferably operates at a pressure substantially lower than any other valve in the system, for example, at a pressure of about 100 to 300 p. s. i., so that a wide range of gas pressures is available for actuating the plunger without opening the upper valves.

At the surface the space between tubing 10 and casing 11 is sealed by a tubing head 22 containing a gas inlet opening 23. A full-opening control valve 24 may be placed on the upper end of the tubing in accordance with customary practice. Above this valve a means is provided to trap the plunger when it is considered desirable. Also, a means is provided to discharge fluid from the tubing without permitting the plunger to escape. In this connection, a trapping device 25 containing a movable cross pin 26 is fixed to the tubing and arranged so that, when the plunger is in the upper end of the tubing at the end of its power stroke, the movable cross pin may be inserted through hole 27 into the tubing to prevent the plunger from falling by gravity down the tubing when the force of the lifting gas has been dissipated to the flow line.

Liquid above the plunger is discharged through perforations 28 into a jacket 29. From this jacket the well fluids and the lifting gas are discharged through opening 31 into the flow line from the well. The section of tubing 32 above perforations 28 is plugged and used as a pneumatic cushion for the plunger. In some cases, it may be desirable to provide in this section a resilient material, such as rubber or a spring, to cushion the shock on the plunger when it is lifted to the surface on the power stroke, at high velocity.

Turning now to a detailed description of the improved gas-lift plunger, Figure 2 shows the elements of one type of such a plunger which is adapted to be reciprocated in a vertical tubing by the difference in temperatures at the bottom and top of the tubing. In this embodiment, an expansible seal or packer 40 is expanded by the movement of a piston 41. Piston 41 operates in a cylinder 42 having a cylinder head 43. This cylinder, piston and cylinder head define a variable-volume chamber 44 which is filled with a liquid. The packer is confined between piston 41 and a circular plate 45. This plate and the cylinder head 43 are rigidly connected by a rod 46, so that the distance therebetween remains substantially constant. Packer 40 and piston 41 are, preferably, coaxial with this rod. The piston is in sealing engagement with the rod by sealing ring 47 and with cylinder 42 by sealing ring 48.

The resilient packer 40, which may be constructed of synthetic rubber or any other resilient material which will not deteriorate in the well, provides the sealing element which prevents the lifting gas from by-passing the plunger on the power stroke. This packer, which is loosely fitted on rod 46, has a nominal outside diameter substantially less than the diameter of the tubing in which it is to operate. For example, a packer between about 1½ and 2 inches in diameter is desirably employed in 2½-inch tubing. The length of the packer may be varied over a substantial range, but I prefer that the length be greater than the diameter. In many cases, the length is desirably from 2 to 5 times or more greater than the diameter.

As mentioned above, chamber 44 is filled with a substantially non-compressible fluid. This fluid also, preferably, has a high coefficient of cubical expansion. Water, which has a coefficient of cubical expansion of 0.000115 inch per degree F., can be used satisfactorily; but the size of the apparatus, including particularly the volume of the variable volume chamber, can be decreased by the use of other liquids having higher coefficients of cubical expansion—for example, petroleum oils, having coefficients in the order of 0.0005, ether, having a coefficient of cubical expansion of 0.00092, and methanol, having a coefficient of cubical expansion of 0.0008, may be used to advantage in many cases. Other incompressible fluids, such as rubber, which have a high coefficient of cubical expansion and behave like a liquid may, in some cases, be substituted for the above-mentioned liquids. For example, if methanol is used as the expanding liquid in the variable volume cell, a length of cell of 6 inches produces a ½-inch change in the length of the packer 40 for 100° F. change in cell temperature. This change in packer length is sufficient to expand the maximum packer diameter approximately from 2.5 to 2.61 inches, when using a packer 6 inches long, 2.5 inches in outside diameter and 1.75 inches inside diameter. If petroleum oil is used, the minimum cell length for such expansion is 10 inches. Using water as the expansion medium, a cell length of about 4 feet is required. Using methanol, a cell 19 inches long produces in this same packer a diameter change from 2.5 to 2.7 inches for 100° F. temperature increase.

In operation, the plunger is assembled as indicated, the variable volume chamber 44 being filled with any of the above-mentioned liquids. Gases are, as completely as possible, displaced from this chamber. In some cases, however, it may be desirable to inject into the chamber a small amount of an inert gas, such as nitrogen. This gas provides a slight amount of cushioning which permits the diameter of packer 40 to be varied over a small range as it passes through the tubing which has minor variations in diameter. The volume of liquid placed in chamber 44 is, obviously, adjusted so that, when bottom-hole temperature is reached, piston 41 will not be forced out of cylinder 42. Under normal conditions, the chamber may be filled through the central bore 49 when the temperature of the liquid is at the temperature of the lifting gas at the well head. Conditions, however, vary from place to place; and, in some cases, the volume of the variable volume chamber and the flowing conditions must be varied to suit the peculiar circumstances.

When the chamber has thus been filled and sealed, the plunger is dropped into the tubing 10, preferably with the packing element on top and the chamber on the bottom. The chamber is thus in direct contact with the lifting or blow-down gas as it expands and discharges through the tubing perforations 28 and opening 31. When the liquid in the chamber is cooled by the expanding gas or by atmospheric temperature, the volume decreases, and the packer 40 is elongated, decreasing its external diameter. As the diameter becomes smaller than the internal diameter of the tubing, the plunger falls relatively freely through the tubing. At the lower end of the tubing, the plunger strikes the liquid before it reaches the bottom stop 19 in the tubing, cushioning the fall of the plunger. In some cases, however, it may be desirable to attach some means, such as a rubber bumper, a spring, or the like, to cylinder head 43 or to the bottom stop 19, further to cushion the fall and prevent injury to the plunger. The plunger then rests on the bottom stop within the tubing as the tubing is filled with liquid through the by-pass 16. The temperature of the liquid in chamber 44 commences to rise due to contact with the hot well fluids. As this liquid temperature rises, the liquid expands, driving piston 41 up, compressing packer 40 longitudinally, and expanding the packer diametrically. When the temperature of the liquid has caused it to expand the diameter of the packer to approximately the internal diameter of the tubing, the packer seals the tubing.

Periodically, as described above, gas is injected into the casing 11 through gas inlet opening 23 to lift the well fluid and the plunger. The amount of gas injected and the frequency of gas injections is governed by the well productivity, gas pressure, and the like, which are determined experimentally on each well. As the plunger rises in the tubing, the packer 40 being of resilient material and the variable volume chamber containing a slight amount of inert gas, the packer expands and contracts, adapting itself to minor variations in the tubing diameter and preventing gas from by-passing the plunger. At the surface, the liquid above the plunger is discharged, through perforations 28 and opening 31, into the flow line or the like, as described above. As this well fluid is displaced from the tubing, gas injection into the casing is stopped, and the pressure on the power fluid or lifting gas is dissipated by expansion. Expansion of this gas cools it, and the cool gas passing over and around cylinder 42 cools the liquid in the chamber, causing it to contract. As the liquid contracts, the packer is elongated, its external diameter is decreased, and the plunger falls relatively freely to the bottom of the tubing, where another cycle is commenced.

Figure 3:
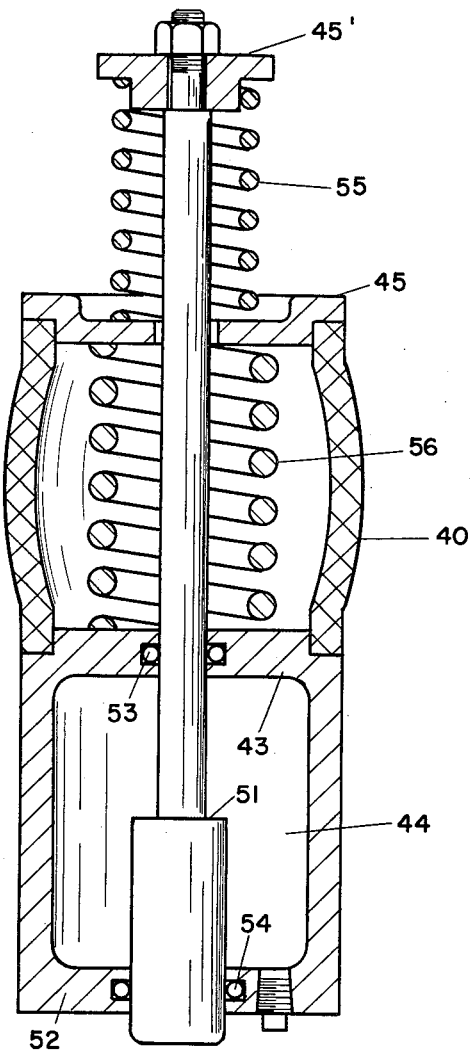
Figure 3 is a cross-sectional view of a preferred embodiment of my improved gas-lift plunger.

While the embodiment above described contains the essential elements of a gas-lift plunger of my improved design, the embodiment shown in Figure 3 is preferred. In that embodiment, as in the embodiment shown in Figure 2, the external diameter of the packer 40 is controlled by the temperature of the liquid in the variable volume chamber 44. In this preferred embodiment, the motion of the piston in actuating the packer is amplified by use of a differential-area or step-piston 51. That is, the piston extends through both cylinder heads 43 and 52, the larger diameter end of the piston extending through cylinder head 52 and the smaller diameter end extending through cylinder head 43 and actuating the packer 40. Sealing rings 53 and 54 in cylinder heads 43 and 52, respectively, seal the chamber around the piston, so that the pressure of liquid in the chamber may be maintained higher or lower than well pressures. Packer 40 may be attached at the lower end, as by clamps, to cylinder head 43. At the upper end, the packer is similarly connected to plate 45. This plate is flexibly mounted between driving spring 55 and return spring 56. A retaining plate 45' is affixed to the upper end of piston 51.

In operation, the chamber 44 is filled as above described, the position of the piston 51 at the time the chamber is filled being adjusted so that, at the temperature of the blow-down gas at the wellhead, the external diameter of packer 40 is at least as small as it is in its normal unstressed condition. The plunger is then placed in the well by removing the upper plug on a section of tubing 32 above perforations 28. The plunger, being at well head temperature, falls relatively freely to bottom stop 19 at the bottom of the well. As the temperature of the liquid in chamber 44 rises due to contact with well fluids at the bottom-hole temperature, differential piston 51 is driven downwardly in the chamber, compressing driving spring 55, which, through plate 45, compresses packer 40 longitudinally, expanding the packer diametrically, and plugging the tubing. Injection of lifting gas below the plunger as above described then causes the plunger to rise in the tubing. At the surface the well fluids are discharged through perforations 28, and the lifting gas drives the packer above the perforations, where it is cushioned by the section of tubing 32. Chamber 44, being exposed to the after-blow of the lifting gas, becomes cooled to the temperature of that gas. The liquid in the chamber therefore contracts, permitting return spring 56 to return the piston and packer to their initial conditions. The plunger in this condition falls again through the tubing, and another cycle is commenced. Thus it will be seen that the operation of this preferred embodiment is substantially the same as the operation of the embodiment shown in Figure 2.

As an example of the motion which is obtained in a packer-actuating apparatus of the preferred embodiment, a chamber 1⅞ inches I. D. and 4 inches long was built and fitted with a piston ¾ inch in diameter on the large end and 11/16 inch in diameter on the small end. When the chamber was filled with water, the piston moved 1.250 inches, with a temperature change of 100° F. With the chamber filled with methanol, the movement was found to be 0.0875 inch per degree change in temperature.

Figure 4:
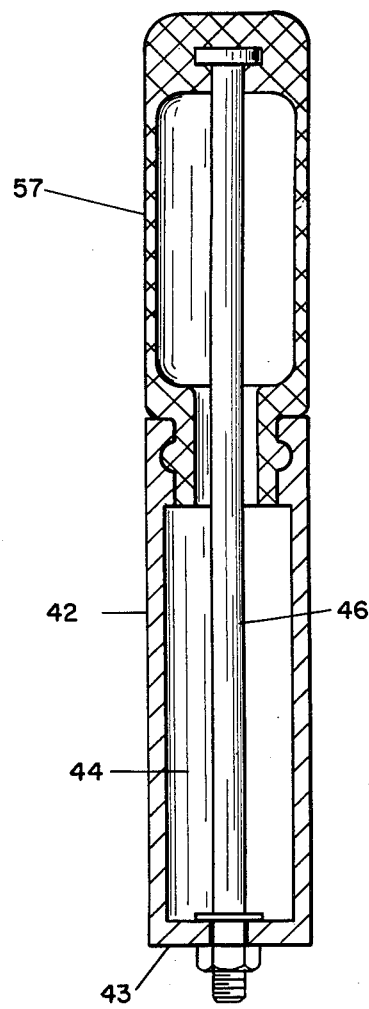
Figure 4 is a cross-sectional view of an alternative embodiment of an apparatus adapted to reciprocate automatically in a well.

Referring now more specifically to Figure 4, another embodiment of an apparatus suitable for use as a gas-lift plunger is shown. In this embodiment the mechanical piston shown in the embodiments of Figures 2 and 3 has been replaced by a liquid piston, and substantially the same results are obtained. In this embodiment, packer 57, which is of the inflatable type, is connected directly to the cylinder 42. Cylinder head 43 closes one end of the cylinder, but the other end of the cylinder is open, permitting fluid communication between the inside of the inflatable packer 57 and the chamber 44. Rod 46 extends through the packer and the chamber and is connected at one end to cylinder head 43 and at the other end to the end of the inflatable packer. This rod restrains movement of the packer longitudinally whereby, upon expansion of the liquid in chamber 44, all of the movement of the packer is directed radially. The chamber 44 and the inflatable packer are filled with a liquid in the same manner as the embodiments above described.

Figure 5:
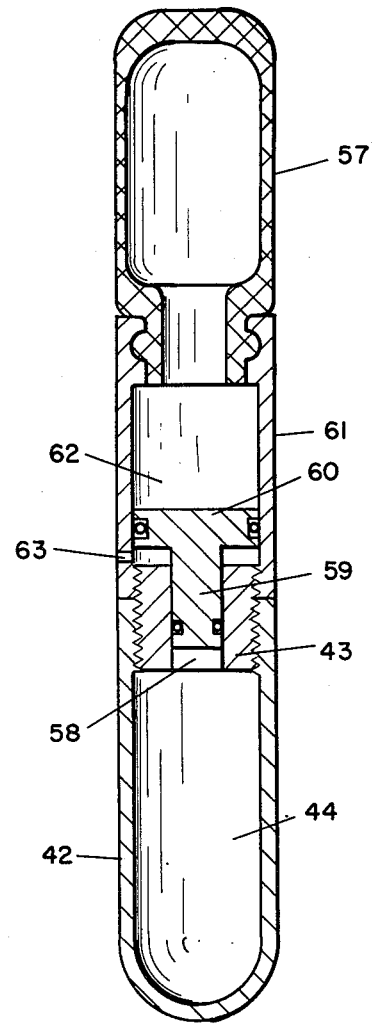
Figure 5 is a cross-sectional view of a modification of the embodiment shown in Figure 4.

Cylinder 42 may be from 1 to 20, or more, feet in length, depending upon the length of the inflatable packer, the diameter of the cylinder, and the liquid in chamber 44. In some cases, it is desirable to make the whole apparatus reasonably short in order to avoid tall wellhead connections at the surface, or for other reasons. In such cases, a mechanical multiplier may be employed. One example of a mechanical multiplier particularly adapted to an inflatable-type packer apparatus is shown in Figure 5. In this modification, a differential-area, hydraulic piston is used to multiply the change in volume of liquid in chamber 44 due to temperature change, so that the movement of expandable packer 57 is greater than it would be if the inside volume of the packer were increased only by the increase in volume of the liquid in chamber 44. In this case, upper cylinder head 54 has a central bore 58. A small-diameter piston 59 is fitted into this bore. This small-diameter piston is direct-connected to large-diameter piston 60 which operates in a cylinder 61. Packer 57 is connected directly to cylinder 61, and the inside of the packer is in fluid communication with chamber 62. Cylinder 61 has a fluid port 63 between large-diameter piston 60 and cylinder head 54 to equalize the pressure under the piston with well pressure.

Both chambers 44 and 62 and inflatable packer 57 are filled with a liquid. The expansion of liquid in chamber 44 due to an increase in temperature forces small-diameter piston 59 upward. Large-diameter piston 60, being connected to the small-diameter piston, is also forced upward, decreasing the volume of chamber 62 and forcing the liquid from this chamber into the inflatable packer 57. Similarly, a temperature decrease of the liquid in chamber 44 causes this movable wall or small-diameter piston 59 to move inwardly, contracting the volume of chamber 44, increasing the volume of chamber 62, withdrawing liquid from inflatable packer 57, and thereby decreasing its diameter. Thus, the construction of the liquid piston apparatus is, in most respects, similar to the construction of the mechanical piston apparatus. Since both types are substantial equivalents, the term "piston" in the appended claims refers to either a liquid piston or a mechanical piston. Also, the automatic operation of this embodiment in a vertical tubing is, in all material respects, identical to the operation of the embodiments above described.

Various means have been proposed for timing the injection of the gas. For example, the gas may be injected in time cycles controlled by a clock mechanism at the surface, it may be injected by use of an intermitter valve actuated by liquid head in the tube, it may be injected by a bottomhole valve actuated from the surface, or the like. This invention is therefore not limited by the method or apparatus used to inject gas, to shut off gas, or the like. The apparatus can be used to prevent paraffin deposition in the tubing. That is, it may be used to drive paraffin scrapers of any of a number of types. In some cases, paraffin knives of the type which collapse on the down stroke may be affixed directly to the plunger to accomplish the same result. Furthermore, various modifications of other auxiliary apparatus, such as tubing packers, formation packers, gas-lift valves, and the like, can be applied to the plunger without departing from the spirit thereof.

The invention should, therefore, not be construed to be limited by the above description, which is presented merely for the purpose of illustration, but should be construed in light of the appended claims.

I claim:

1. An apparatus for raising fluids through a vertical tubing comprising a closed variable volume chamber, a liquid in said chamber, a piston in said chamber forming a movable wall therein, said liquid having a temperature coefficient of cubical expansion substantially different from the temperature coefficient of cubical expansion of said chamber, whereby said piston is moved in said chamber by a change in volume of said liquid due to a temperature change of said liquid, and an expandable packer operatively connected at one end with said chamber and at the other end with said piston, whereby the movement of said piston is adapted to vary the diameter of said packer.

2. A well apparatus for automatic reciprocation in a vertical tubing containing fluid comprising a cylinder, a fixed head in one end of said cylinder, a movable head in the other end of said cylinder, said cylinder, said fixed head and said movable head forming a variable volume chamber, a liquid in said chamber, said movable head being moved by a change in volume of said chamber when the temperature of said liquid is changed due to a variation in the temperature of said fluid, a packer connected at one end to said cylinder and at the other end to said movable head, the movement of said movable head to increase the volume of said chamber expanding said packer to plug said tubing upon an increase in the temperature of said liquid and the movement of said movable head to decrease the volume of said chamber contracting said packer to unplug said tubing upon a decrease in the temperature of said liquid.

3. A well apparatus for automatic reciprocation in the tubing of a well producing fluid comprising a cylinder, a fixed head in one end of said cylinder, a movable head in the other end of said cylinder, said cylinder, said fixed head and said movable head forming a variable volume chamber, a liquid in said chamber, said movable head being moved by a change in the volume of said chamber when the temperature of said liquid is changed due to a variation in the temperature of said fluid, a packer connected to said chamber, and tubing closure means operatively connected to said movable head to prevent said fluid from bypassing said apparatus in said tubing, the movement of said movable head to increase the volume of said chamber actuating said tubing closure means to plug said tubing upon increase in temperature of said liquid at the bottom of said tubing, and the movement of said movable head to decrease the volume of said chamber actuating said tubing closure to unplug said tubing upon a decrease in the temperature of said liquid at the upper end of said tubing, whereby, due to the time lag required for said fluid to heat said liquid at the bottom end of said tubing and to cool said liquid at the top end of said tubing, said apparatus will automatically reciprocate in said tubing when said well is producing fluid.

4. A gas-lift plunger for raising well fluids through a tubing comprising a cylindrical closed variable volume chamber, a piston in said chamber, a liquid confined in said chamber by said piston, said piston being moved in said chamber by a change in the temperature of said liquid, and an expandable cylindrical packer affixed at one end to said chamber and at the other end to said piston, whereby changes in temperature of said liquid vary the length of said packer.

5. A gas-lift plunger according to claim 4 in which said cylindrical packer is resiliently connected to said piston, whereby the outside diameter of said packer may be varied to accommodate changes in the diameter of said tubing without a substantial temperature change.

6. A gas-lift plunger for raising well fluids through a vertical tubing comprising a cylinder, a cylinder head in each end of said cylinder, a step piston within said cylinder, the large diameter end of said piston extending through one cylinder head and the small diameter end of said piston extending through the other cylinder head, a liquid in said cylinder, said liquid having a temperature coefficient of cubical expansion different from the temperature coefficient of cubical expansion of said chamber whereby said piston is moved in said chamber by a change in the temperature of said plunger, a cylindrical packer affixed at one end to said cylinder, and means to connect the other end of said packer to said piston whereby the length of said packer is changed as said liquid expands and moves said piston.

7. A gas-lift plunger according to claim 6 in which said means is resilient, whereby the outside diameter of said packer may be varied to accommodate changes in the diameter of said tubing without a substantial temperature change.

8. A gas-lift plunger for raising well fluids through a vertical tubing comprising a cylinder, a cylinder head in each end of said cylinder, a step piston within and coaxial with said cylinder, the large diameter end of said piston extending through one cylinder head and the small diameter end of said piston extending through the other cylinder head, said cylinder, said cylinder heads, and said piston defining a variable volume chamber, a liquid having a high temperature coefficient of cubical expansion within said chamber, and a cylindrical packer connected rigidly at one end to one of said cylinder heads and at the other end connected resiliently to said piston, whereby the diameter of said packer is varied as the temperature of said liquid changes, and the outside diameter of said packer may be varied to accommodate changes in the diameter of said tubing without a temperature change in said liquid.

9. A gas-lift plunger according to claim 8 in which said cylindrical packer is connected rigidly at one end to the cylinder head through which the small diameter of said step piston extends, whereby said packer is compressed by the movement of said step piston due to an increase in temperature of said liquid.

10. A plunger for automatic reciprocation in a vertical tubing comprising a closed variable volume chamber having fixed walls and at least one movable wall, said chamber being capable of holding a liquid, and an expandable cylindrical packer attached at one end to said fixed walls and at the other end to said movable wall, the diameter of said packer being varied by the expansion and contraction of a liquid having a high temperature coefficient of cubical expansion within said chamber and by the movement of said movable wall relative to said fixed walls.

References Cited in the file of this patent

UNITED STATES PATENTS

| | | |
|---|---|---|
| 1,932,962 | Fletcher | Oct. 31, 1933 |
| 1,993,258 | Bettis | Mar. 5, 1935 |
| 2,013,111 | Scott | Sept. 3, 1935 |
| 2,172,636 | Coberly | Sept. 12, 1939 |
| 2,237,408 | Burgher | Apr. 8, 1941 |
| 2,246,577 | Davis | June 24, 1941 |
| 2,252,047 | Steenbergh | Aug. 12, 1941 |
| 2,527,929 | Hebard | Oct. 31, 1950 |